(12) United States Patent
Yuk et al.

(10) Patent No.: US 10,015,698 B2
(45) Date of Patent: *Jul. 3, 2018

(54) METHOD FOR PERFORMING A COOPERATIVE OPERATION BETWEEN HETEROGENEOUS NETWORKS AND DEVICE FOR SAME

(71) Applicant: LG ELECTRONICS INC., Seoul (KR)

(72) Inventors: Youngsoo Yuk, Anyang-si (KR); Jinsam Kwak, Anyang-si (KR); Eunjong Lee, Anyang-si (KR); Heejeong Cho, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/177,824

(22) Filed: Jun. 9, 2016

(65) Prior Publication Data

US 2016/0295460 A1   Oct. 6, 2016

Related U.S. Application Data

(63) Continuation of application No. 14/232,221, filed as application No. PCT/KR2012/005544 on Jul. 12, 2012, now Pat. No. 9,392,535.

(Continued)

(51) Int. Cl.
*H04W 48/16* (2009.01)
*H04W 28/08* (2009.01)
(Continued)

(52) U.S. Cl.
CPC .......... *H04W 28/08* (2013.01); *H04B 17/318* (2015.01); *H04W 24/10* (2013.01);
(Continued)

(58) Field of Classification Search
CPC ..... H04W 28/08; H04W 24/10; H04W 48/16; H04W 56/00; H04W 72/042;
(Continued)

(56) References Cited

U.S. PATENT DOCUMENTS

| 5,499,386 | A | 3/1996 | Karlsson |
| 7,171,216 | B1 | 1/2007 | Choksi |

(Continued)

FOREIGN PATENT DOCUMENTS

| KR | 10-2008-0002877 | 1/2008 |
| KR | 10-2009-0004896 | 1/2009 |

(Continued)

OTHER PUBLICATIONS

PCT International Application No. PCT/KR2012/005544, Written Opinion of the International Searching Authority dated Jan. 24, 2013, 15 pages.

*Primary Examiner* — Mong-Thuy Tran
(74) *Attorney, Agent, or Firm* — Lee Hong Degerman Kang Waimey

(57) ABSTRACT

The present invention relates to a method for performing a cooperative operation between heterogeneous networks and a device for same. A method for a first type base station to perform a cooperative operation between heterogeneous networks in a wireless communication system includes receiving a downlink synchronization channel from at least one second type base station; obtaining an identifier (ID) of the second type base station by using the received downlink synchronization channel; and transmitting at least one of a channel number and a bandwidth of a center frequency of the first type base station and the cell ID of the second type base station to a server. The first type base station and the second type base station use different wireless communication methods or wireless access methods.

6 Claims, 11 Drawing Sheets

Related U.S. Application Data

(60) Provisional application No. 61/506,656, filed on Jul. 12, 2011.

(51) Int. Cl.
   H04W 56/00 (2009.01)
   H04B 17/318 (2015.01)
   H04W 24/10 (2009.01)
   H04W 72/04 (2009.01)
   H04W 76/02 (2009.01)
   H04W 84/04 (2009.01)
   H04W 84/12 (2009.01)

(52) U.S. Cl.
   CPC ........... H04W 48/16 (2013.01); H04W 56/00 (2013.01); H04W 72/042 (2013.01); H04W 76/025 (2013.01); H04W 84/042 (2013.01); H04W 84/12 (2013.01)

(58) Field of Classification Search
   CPC . H04W 76/025; H04W 84/042; H04W 84/12; H04B 17/318
   USPC .......................................... 455/434; 370/338
   See application file for complete search history.

(56) References Cited

U.S. PATENT DOCUMENTS

| | | | |
|---|---|---|---|
| 7,835,740 | B2 | 11/2010 | Claussen |
| 8,019,335 | B2 | 9/2011 | Kallio |
| RE43,138 | E | 1/2012 | Hasegawa |
| 8,538,435 | B2 | 9/2013 | Immendorf et al. |
| 8,676,186 | B2 | 3/2014 | Niu |
| 9,392,535 | B2* | 7/2016 | Yuk ........................ H04W 56/00 |
| 2009/0265543 | A1 | 10/2009 | Khetawat et al. |
| 2009/0318124 | A1* | 12/2009 | Haughn .................... G06F 8/65 455/418 |
| 2010/0003986 | A1 | 1/2010 | Chen et al. |
| 2010/0165942 | A1 | 7/2010 | Liao et al. |
| 2010/0216475 | A1 | 8/2010 | Hoole |
| 2011/0032909 | A1 | 2/2011 | Park et al. |
| 2011/0075557 | A1* | 3/2011 | Chowdhury ............ H04L 12/14 370/230 |
| 2011/0222523 | A1 | 9/2011 | Fu et al. |
| 2011/0243108 | A1 | 10/2011 | Park et al. |
| 2011/0300870 | A1 | 12/2011 | Chun et al. |
| 2011/0320588 | A1* | 12/2011 | Raleigh ............... H04W 36/245 709/224 |
| 2012/0026865 | A1* | 2/2012 | Fan ........................ H04W 76/02 370/225 |
| 2012/0224484 | A1* | 9/2012 | Babiarz ............... H04L 41/5019 370/235 |
| 2012/0230191 | A1* | 9/2012 | Fang ...................... H04W 36/22 370/235 |
| 2014/0043979 | A1* | 2/2014 | Etemad ................ H04B 7/2656 370/237 |

FOREIGN PATENT DOCUMENTS

| | | |
|---|---|---|
| KR | 10-2009-0117443 | 11/2009 |
| WO | 2010/108129 | 9/2010 |

\* cited by examiner

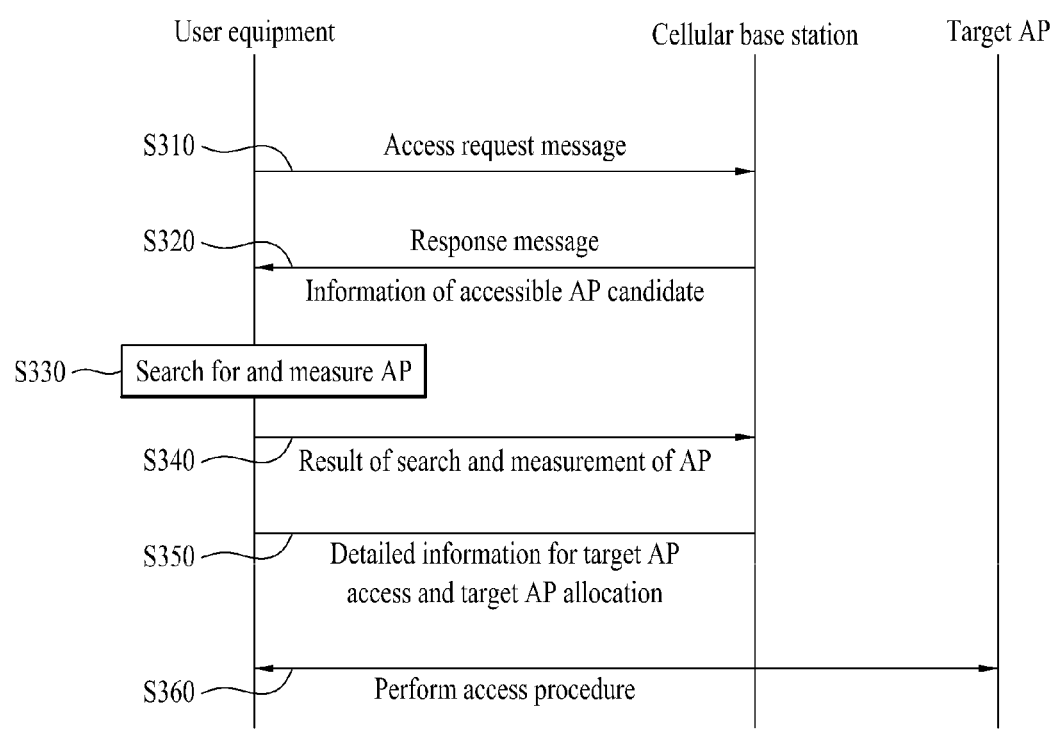

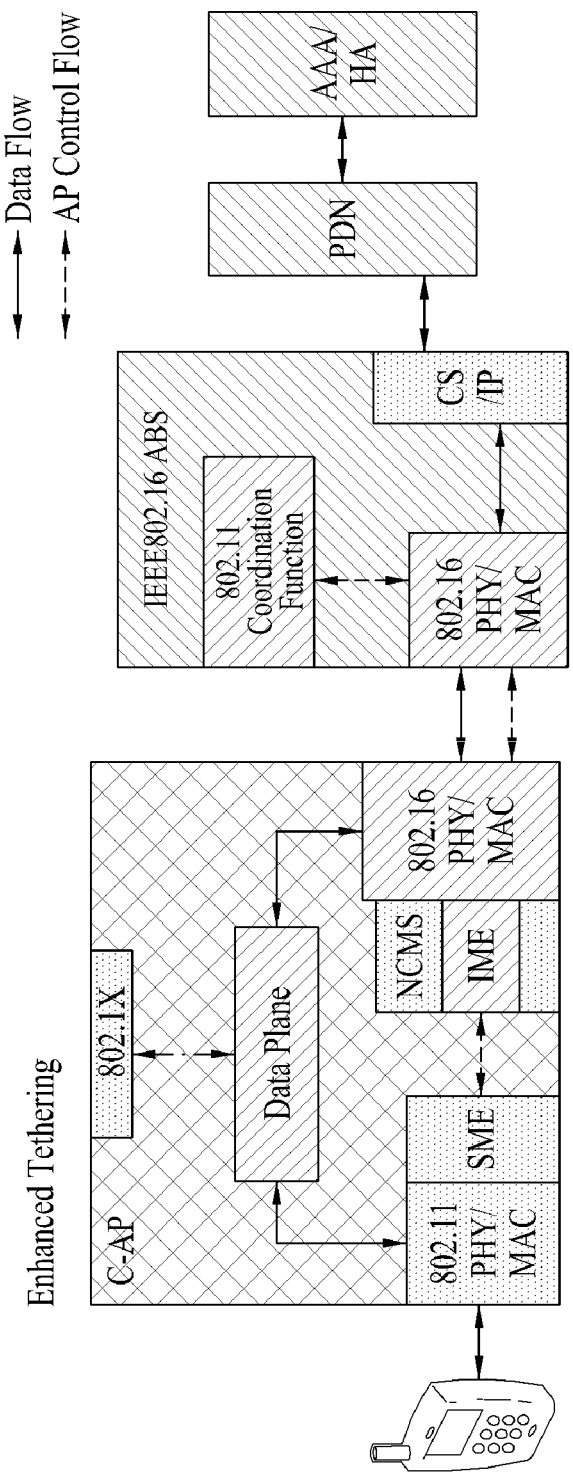

METHOD FOR PERFORMING A COOPERATIVE OPERATION BETWEEN HETEROGENEOUS NETWORKS AND DEVICE FOR SAME

CROSS-REFERENCE TO RELATED APPLICATIONS

This application is a continuation of U.S. patent application Ser. No. 14/232,221, filed on Jan. 10, 2014, now U.S. Pat. No. 9,392,535, which is the National Stage filing under 35 U.S.C. 371 of International Application No. PCT/KR2012/005544, filed on Jul. 12, 2012, which claims the benefit of U.S. Provisional Application No. 61/506,656, filed on Jul. 12, 2011, the contents of which are all hereby incorporated by reference herein in their entirety.

TECHNICAL FIELD

The present invention relates to wireless communication, and more particularly, to a method for performing a cooperative operation between heterogeneous networks and a method for enabling a user equipment to detect a base station in a wireless communication system that performs a cooperative operation between heterogeneous networks.

BACKGROUND ART

In the current communication environment, two or more heterogeneous networks may exist. For example, various heterogeneous networks such as a WiMAX network which is an example of a mobile communication system and a WiFi network may exist. The heterogeneous network means a network that uses a communication system (or radio access system) different from that used by a specific network, and a heterogeneous user equipment means a user equipment which belongs to a heterogeneous network that uses a communication system different from that of the specific network.

For example, on the basis of the WiMAX network and the user equipment which belongs to the WiMAX network, since the WiFi network uses a communication system different from that of the WiMAX network, the WiFi network corresponds to a heterogeneous network. The user equipment which belongs to the WiFi network corresponds to the heterogeneous user equipment. By contrast, on the basis of the WiFi network, the WiMAX network may be the heterogeneous network, and the user equipment which belongs to the WiMAX network may be the heterogeneous network.

Also, a multi-mode user equipment means a user equipment that supports two or more wireless access systems or wireless communication systems. WiFi means a short distance communication network (LAN) that allows ultra-speed Internet within a given distance of a place where an access point (AP) is provided, and uses a radio wave or infrared transmission mode and may be referred to as a wireless LAN.

In a wireless environment, a user equipment may use a heterogeneous network which exists to support a heterogeneous user equipment in addition to a radio access technology (RAT) provided to efficiently transmit and receive a signal or improve throughput. At this time, the multi-mode user equipment that supports a plurality of RATs to use two or more heterogeneous networks may transmit and receive a signal without being restricted to a specific RAT by using another RAT that may provide the best service under the current status. The number of heterogeneous networks (a plurality of RATs) to which the multi-mode user equipment accesses to transmit and receive a signal may be two or more. Accordingly, the multi-mode user equipment may transmit and receive a signal to and from each of a base station, which uses RAT different from that of a serving base station, and base stations, which use heterogeneous networks (heterogeneous RAT), or through cooperation between the base stations. Hereinafter, in the present invention, the multi-mode user equipment, which supports two or more wireless access systems or wireless communication systems, will be referred to as "user equipment".

In the wireless communication system, a cellular network and a wireless LAN coexist, and organized cooperation between the cellular network and the wireless LAN will be required. However, since the cellular network and the wireless LAN have their respective features different from each other, it is preferable to perform mutual complementary operation. However, a method for organized cooperation between the cellular network and the wireless LAN has not been discussed.

DISCLOSURE

Technical Problem

An object of the present invention devised to solve the conventional problem is to provide a method for enabling a user equipment to detect a base station in a wireless communication system that performs a cooperative operation between heterogeneous networks.

Another object of the present invention devised to solve the conventional problem is to provide a method for performing a cooperative operation of a first type base station in a wireless communication system that performs a cooperative operation between heterogeneous networks.

Still another object of the present invention devised to solve the conventional problem is to provide a user equipment in a wireless communication system that performs a cooperative operation between heterogeneous networks.

Further still another object of the present invention devised to solve the conventional problem is to provide a first type base station for performing a cooperative operation in a wireless communication system that performs a cooperative operation between heterogeneous networks.

It will be appreciated by persons skilled in the art that the objects that could be achieved with the present invention are not limited to what has been particularly described hereinabove and the above and other objects that the present invention could achieve will be more clearly understood from the following detailed description.

Technical Solution

To achieve these objects and other advantages and in accordance with the purpose of the invention, a method of detecting a base station by a user equipment in a wireless communication system that performs a cooperative operation between heterogeneous networks comprises receiving at least one interworking signal (IWS) from at least one first type base station through a transmission band of a second type base station; acquiring cell identifier (ID) information from the received at least one IWS; and scanning a base station, which uses the same wireless communication scheme as that of the at least one first type base station on the basis of the acquired cell ID information, wherein the first type base station and the second type base station use different wireless communication schemes or wireless access schemes from each other. The method may further comprise reporting the result of scanning or the result of cell measurement, which is measured by the scanning, to the second type base station. The cell ID may correspond to ID reserved for the first type base station. The IWS may be a synchronization channel (SCH) or a common reference signal (CRS). The user equipment supports both a first wireless communication scheme used by the first type base station and a second wireless communication scheme used by the second type base station. In this case, the first type base station may be a cooperative-access point (C-AP) that uses a wireless local area network (WLAN) mode, and the second type base station may be a cellular base station that uses a cellular mode.

To achieve these objects and other advantages and in accordance with the purpose of the invention, according to another aspect of the present invention, a method of performing a cooperation operation by a first type base station in a wireless communication system that performs a cooperative operation between heterogeneous networks comprises receiving a downlink synchronization channel from at least one second type base station; acquiring cell identifier (ID) of the second type base station by using the received downlink synchronization channel; and transmitting cell ID of the second type base station and at least one of a channel number and a bandwidth of a center frequency of the first type base station to a server, wherein the first type base station and the second type base station use different wireless communication schemes or wireless access schemes from each other.

The method may further comprise receiving a broadcast channel (BCH) from the at least one second type base station; acquiring full base station ID (BSID) of the second type base station based on the BCH; and transmitting the acquired full BSID to the server.

Also, the method may further comprise the steps of receiving a common reference signal (CRS) from the at least one second type base station; measuring strength of a reference signal by using the received CRS; and reporting a value of the strength of the reference signal for a predetermined number of second type base stations to the server in the order of the great strength of the measured reference signal.

Also, the method may further comprise transmitting information of at least one another first type base station or location information of the first type base station to the server.

Also, the method may further comprise the steps of acquiring uplink timing synchronization with the second type base station; measuring timing advance (TA) between the first and second type base stations in accordance with the acquired synchronization; and reporting the acquired timing advance information to the server.

The channel number of the center frequency of the first type base station may be an E-UTRA Absolute Radio Frequency Channel Number (EARFCN). The first type base station may be a cooperative-access point (C-AP) that uses a wireless local area network (WLAN) mode, and the second type base station may be a cellular base station that uses a cellular scheme.

To achieve these objects and other advantages and in accordance with the purpose of the invention, according to still another aspect of the present invention, a user equipment in a wireless communication system that performs a cooperative operation between heterogeneous networks comprises a receiver receiving at least one interworking signal (IWS) from at least one first type base station through a transmission band of a second type base station; and a processor acquiring cell identifier (ID) information from the received at least one IWS and scanning a base station, which uses the same wireless communication mode as that of the at least one first type base station on the basis of the acquired cell ID information, wherein the first type base station and the second type base station use different wireless communication schemes or wireless access schemes from each other. The user equipment may further comprise a transmitter reporting the result of scanning or the result of cell measurement, which is measured by the scanning, to the second type base station.

To achieve these objects and other advantages and in accordance with the purpose of the invention, according to further still another aspect of the present invention, a first type base station of performing a cooperation operation in a wireless communication system that performs a cooperative operation between heterogeneous networks comprises a receiver receiving a downlink synchronization channel from at least one second type base station; a processor acquiring cell identifier (ID) of the second type base station by using the received downlink synchronization channel; and a transmitter transmitting cell ID of the second type base station and at least one of a channel number and a bandwidth of a center frequency of the first type base station to a server, wherein the first type base station and the second type base station use different wireless communication schemes or wireless access schemes from each other.

The receiver of the first type base station may be configured to further receive a broadcast channel (BCH) from the at least one second type base station, the processor may be configured to further acquire full base station ID (BSID) of the second type base station based on the BCH, and the transmitter may be configured to further transmit the acquired full BSID to the server.

Also, the receiver of the first type base station may be configured to receive a common reference signal (CRS) from the at least one second type base station, the processor may be configured to measure strength of a reference signal by using the received CRS, and the transmitter may be configured to report a value of the strength of the reference signal for a predetermined number of second type base stations to the server in the order of the great strength of the measured reference signal.

Also, the transmitter may further be configured to transmit information of at least one another first type base station or location information of the first type base station to the server.

Also, the processor of the first type base station may further be configured to acquire uplink timing synchronization with the second type base station and measure timing advance (TA) between the first and second type base stations in accordance with the acquired synchronization, and the transmitter may further be configured to report the acquired timing advance information to the server.

Advantageous Effects

In accordance with various embodiments of the present invention, organized cooperation may be performed between a cellular network and a WLAN in a broadband wireless communication system, and communication throughput of the user equipment may be more improved by organized cooperation between two systems having their respective features different from each other.

It will be appreciated by persons skilled in the art that that the effects that could be achieved with the present invention are not limited to what has been particularly described hereinabove and other advantages of the present invention will be more clearly understood from the following detailed description.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 3 is a diagram illustrating a procedure of performing a cooperative operation of a user equipment with a cellular base station in case that the user equipment searches for AP;

FIGS. 6A and 6B are diagrams illustrating two interaction scenarios between a cellular base station and a WLAN AP;

BEST MODE FOR CARRYING OUT THE INVENTION

Figure 1:
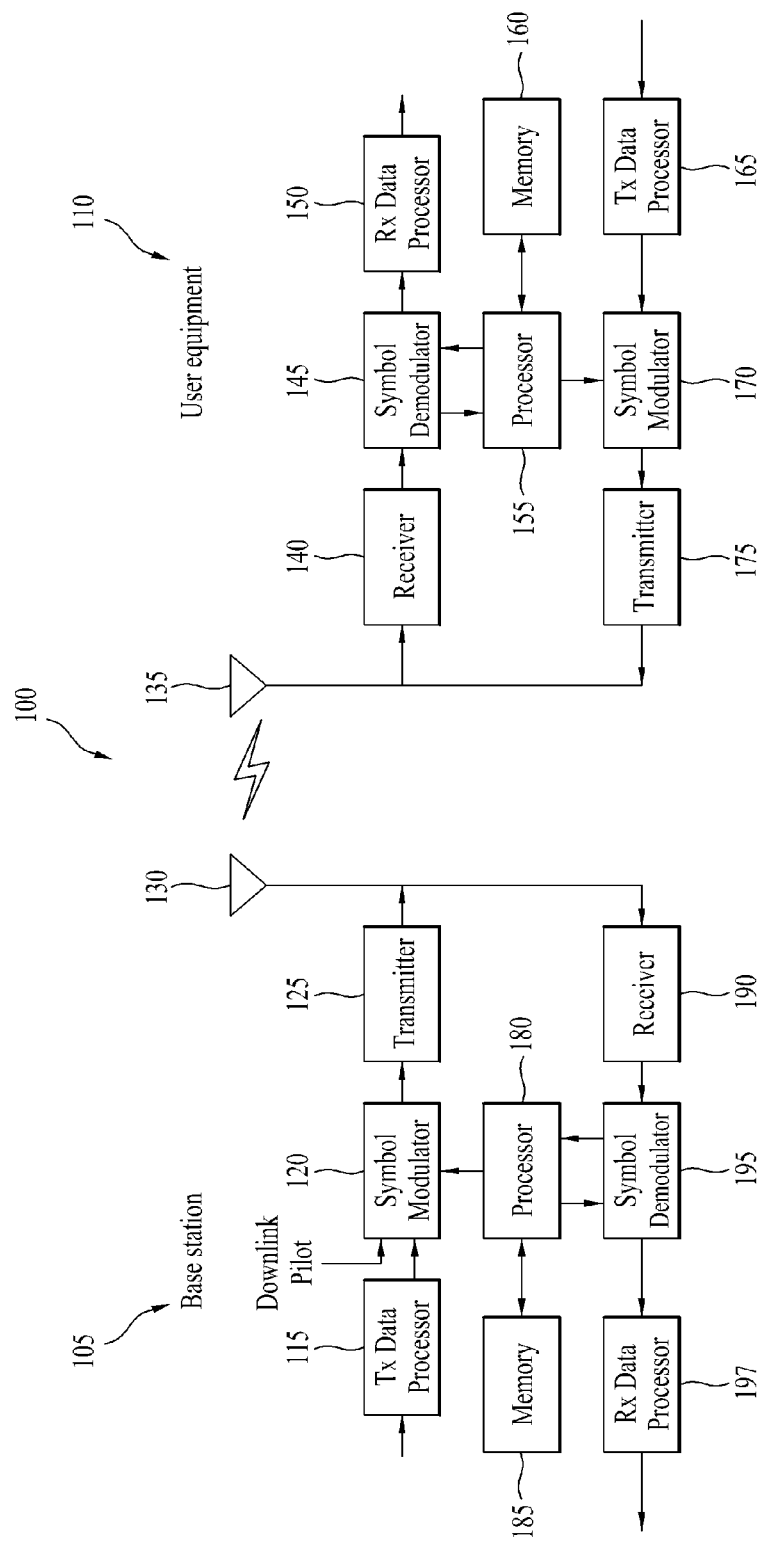
FIG. 1 is a block diagram illustrating configurations of a base station 105 and a user equipment 110 in a wireless communication system 100.

Hereinafter, the preferred embodiments of the present invention will be described in detail with reference to the accompanying drawings. It is to be understood that the detailed description, which will be disclosed along with the accompanying drawings, is intended to describe the exemplary embodiments of the present invention, and is not intended to describe a unique embodiment with which the present invention can be carried out. The following detailed description includes detailed matters to provide full understanding of the present invention. However, it will be apparent to those skilled in the art that the present invention can be carried out without the detailed matters.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts. Also, specific terminologies hereinafter used in the embodiments of the present invention are provided to assist understanding of the present invention, and various modifications may be made in the specific terminologies within the range that they do not depart from technical spirits of the present invention.

Moreover, in the following description, it is assumed that a user equipment (UE) refers to a mobile or fixed type user equipment such as a user equipment (MS) and an advanced mobile station (AMS). Also, it is assumed that the base station refers to a random node of a network terminal, such as Node B, eNode B, and access point (AP), which performs communication with the user equipment.

In a wireless communication system, a user equipment may receive information from a base station through a downlink (DL), and may also transmit information to the base station through an uplink. Examples of information transmitted from and received by the user equipment include data and various kinds of control information. Various physical channels exist depending on types and usage of information transmitted from or received by the user equipment.

Examples of a wireless communication system (or radio access system) described in the present invention include a code division multiple access (CDMA) system, a frequency division multiple access (FDMA) system, a time division multiple access (TDMA) system, an orthogonal frequency division multiple access (OFDMA) system, and a single carrier frequency division multiple access (SC-FDMA) system. The CDMA may be implemented by the radio technology such as universal terrestrial radio access (UTRA) or CDMA2000. The TDMA may be implemented by the radio technology such as global system for mobile communications (GSM)/general packet radio service (GPRS)/enhanced data rates for GSM evolution (EDGE). The OFDMA may be implemented by the radio technology such as IEEE 802.11 (Wi-Fi), IEEE 802.16 (WiMAX), IEEE 802.20, and evolved UTRA (E-UTRA). The UTRA is a part of a universal mobile telecommunications system (UMTS). A $3^{rd}$ generation partnership project long term evolution (3GPP LTE) communication system is a part of an evolved UMTS (E-UMTS) that uses E-UTRA, and uses OFDMA in a downlink while uses SC-FDMA in an uplink. LTE-advanced (LTE-A) is an evolved version of the 3GPP LTE system.

FIG. 1 is a block diagram illustrating configurations of a base station 105 and a user equipment 110 in a wireless communication system.

Although one base station 105, one user equipment 110 are shown for simplification of a wireless communication system 100, the wireless communication system 100 may include one or more base stations and/or one or more user equipments.

Referring to FIG. 1, the base station 105 may include a transmitting (Tx) data processor 115, a symbol modulator 120, a transmitter 125, a transmitting and receiving antenna 130, a processor 180, a memory 185, a receiver 190, a symbol demodulator 195, and a receiving (Rx) data processor 297. The user equipment 110 may include a Tx data processor 165, a symbol modulator 170, a transmitter 175, a transmitting and receiving antenna 135, a processor 155, a memory 160, a receiver 140, a symbol demodulator 145, and an Rx data processor 150. Although the antennas 130 and 135 are respectively shown in the base station 105 and the user equipment 110, each of the base station 105 and the user equipment 110 includes a plurality of antennas. Accordingly, the base station 105 and the user equipment 110 according to the present invention support a multiple input multiple output (MIMO) system. Also, the base station 105 according to the present invention may support both a single user-MIMO (SU-MIMO) system and a multi user-MIMO (MU-MIMO) system.

On a downlink, the Tx data processor 115 receives traffic data, formats and codes the received traffic data, interleaves and modulates (or symbol maps) the coded traffic data, and provides the modulated symbols ("data symbols"). The symbol modulator 120 receives and processes the data symbols and pilot symbols and provides streams of the symbols.

The symbol modulator 120 multiplexes the data and pilot symbols and transmits the multiplexed data and pilot symbols to the transmitter 125. At this time, the respective transmitted symbols may be a signal value of null, the data symbols and the pilot symbols. In each symbol period, the pilot symbols may be transmitted continuously. The pilot symbols may be frequency division multiplexing (FDM) symbols, orthogonal frequency division multiplexing (OFDM) symbols, time division multiplexing (TDM) symbols, or code division multiplexing (CDM) symbols.

The transmitter 125 receives the streams of the symbols and converts the received streams into one or more analog symbols. Also, the transmitter 125 generates downlink signals suitable for transmission through a radio channel by additionally controlling (for example, amplifying, filtering and frequency upconverting) the analog signals. Subsequently, the downlink signals are transmitted to the user equipment through the antenna 130.

In the configuration of the user equipment 110, the antenna 135 receives the downlink signals from the base station 105 and provides the received signals to the receiver 140. The receiver 140 controls (for example, filters, amplifies and frequency downcoverts) the received signals and digitalizes the controlled signals to acquire samples. The symbol demodulator 145 demodulates the received pilot symbols and provides the demodulated pilot symbols to the processor 155 to perform channel estimation.

Also, the symbol demodulator 145 receives a frequency response estimation value for the downlink from the processor 155, acquires data symbol estimation values (estimation values of the transmitted data symbols) by performing data demodulation for the received data symbols, and provides the data symbol estimation values to the Rx data processor 150. The Rx data processor 50 demodulates (i.e., symbol de-mapping), deinterleaves, and decodes the data symbol estimation values to recover the transmitted traffic data.

Processing based on the symbol demodulator 145 and the Rx data processor 150 is complementary to processing based on the symbol demodulator 120 and the Tx data processor 115 at the base station 105.

On an uplink, the Tx data processor 165 of the user equipment 110 processes traffic data and provides data symbols. The symbol modulator 170 receives the data symbols, multiplexes the received data symbols with the pilot symbols, performs modulation for the multiplexed symbols, and provides the streams of the symbols to the transmitter 175. The transmitter 175 receives and processes the streams of the symbols and generates uplink signals. The uplink signals are transmitted to the base station 105 through the antenna 135.

The uplink signals are received in the base station 105 from the user equipment 110 through the antenna 130, and the receiver 190 processes the received uplink signals to acquire samples. Subsequently, the symbol demodulator 195 processes the samples and provides data symbol estimation values and the pilot symbols received for the uplink. The Rx data processor 197 recovers the traffic data transmitted from the user equipment 110 by processing the data symbol estimation values.

The processors 155 and 180 of the user equipment 110 and the base station 105 respectively command (for example, control, adjust, manage, etc.) the operation at the user equipment 110 and the base station 105. The processors 155 and 180 may respectively be connected with the memories 160 and 185 that store program codes and data. The memories 160 and 185 respectively connected to the processor 180 store operating system, application, and general files therein.

Each of the processors 155 and 180 may be referred to as a controller, a microcontroller, a microprocessor, and a microcomputer. Meanwhile, the processors 155 and 180 may be implemented by hardware, firmware, software, or their combination. If the embodiment of the present invention is implemented by hardware, application specific integrated circuits (ASICs), digital signal processors (DSPs), digital signal processing devices (DSPDs), programmable logic devices (PLDs), and field programmable gate arrays (FPGAs) configured to perform the embodiment of the present invention may be provided in the processors 155 and 180.

Meanwhile, if the embodiment according to the present invention is implemented by firmware or software, firmware or software may be configured to include a module, a procedure, or a function, which performs functions or operations of the present invention. Firmware or software configured to perform the present invention may be provided in the processors 155 and 180, or may be stored in the memories 160 and 185 and driven by the processors 155 and 180.

Layers of a radio interface protocol between the user equipment 110 or the base station 105 and a wireless communication system (network) may be classified into a first layer L1, a second layer L2 and a third layer L3 on the basis of three lower layers of OSI (open system interconnection) standard model widely known in communication systems. A physical layer belongs to the first layer L1 and provides an information transfer service using a physical channel. A radio resource control (RRC) layer belongs to the third layer and provides control radio resources between the user equipment and the network. The user equipment and the base station may exchange RRC messages with each another through the RRC layer.

The base station 105 shown in FIG. 1 includes a cellular base station (or cellular network base station) and a cooperative access point (C-AP), which are disclosed in the present invention.

The configuration of the system considered by the present invention will be described as follows. First of all, the user equipment has a capability of accessing a cellular network (WiMAX or 3GPP HSPA or LTE, etc.) and a wireless local area network (WLAN) at the same time. Also, a communication environment is provided in which a cellular system covers all areas and a WLAN access point (WLAN AP) exists within coverage of the cellular system. The respective systems interact with one network provider.

The user equipment interacts with a cellular network which is a primary network and may access the WLAN AP through a secondary network connection. The cellular network which is a primary network performs various control functions such as handover paging, scheduling, security, and network access, and may transmit and receive general user data. The user equipment transmits and receives user data only through the WLAN which is a secondary network.

Generally, although the user equipment performs communication to the cellular network, if the WLAN AP is located near the user equipment, the user equipment may transmit and receive data by using the WLAN AP. In this case, if the WLAN fails to support QoS in case of a service such as a phone that should assure QoS, the user equipment transmits data through the cellular network. Generally, it is efficient that the user equipment transmits data through the WLAN in case of high data capacity such as hyper text transfer protocol (HTTP) or file transfer protocol (FTP).

In this way, the user equipment may perform data communication by using more excellent network, and high-speed data transmission may be distributed into the WLAN in view of the system, whereby system efficiency may be improved. Although this method may be performed currently, there is limitation in efficiency due to switching based operation. Also, since two networks are operated independently, it is inefficient in view of security/authentication, IP flow mobility, and network discovery. In particular, it may be very inefficient due to a lack of hierarchical concept such as a primary network and a secondary network as suggested. In order to solve this problem, the present invention suggests an operation scenario through cooperation between the cellular network and the WLAN AP.

Interaction of System

The base station (or may be referred to as a cellular network) of the cellular network and the WLAN AP may interact with each other in accordance with three scenarios as follows. Hereinafter, interaction scenarios between the base station of the cellular network and the WLAN AP will be described with reference to the accompanying drawings.

Figure 2A:
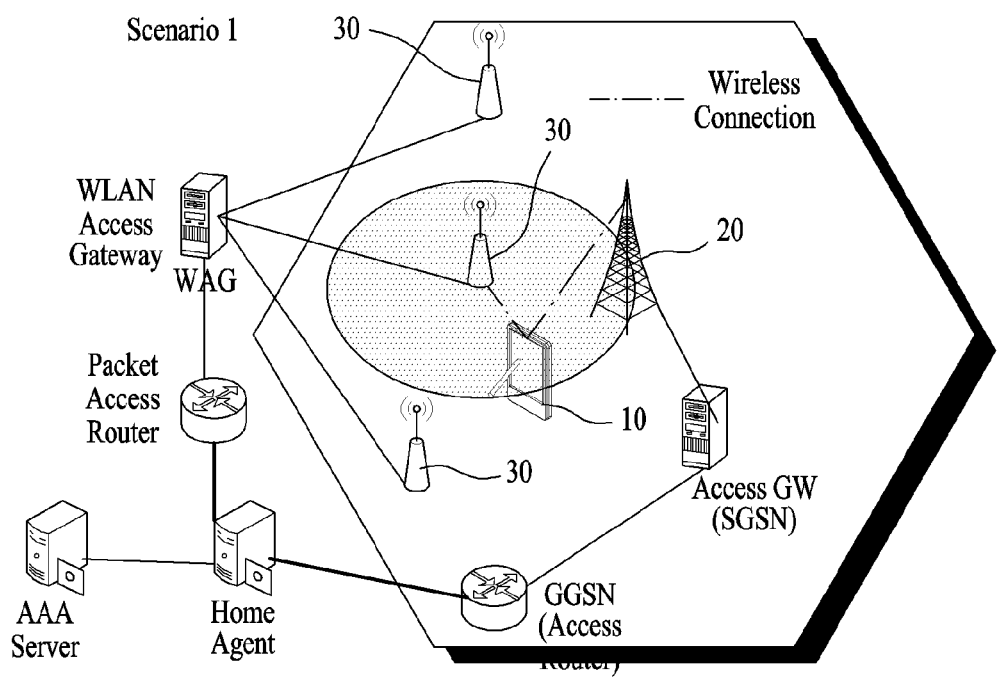
FIGS. 2A to 2C are diagrams illustrating an interaction scenario between a base station of a cellular network and a WLAN AP.
Figure 2B:
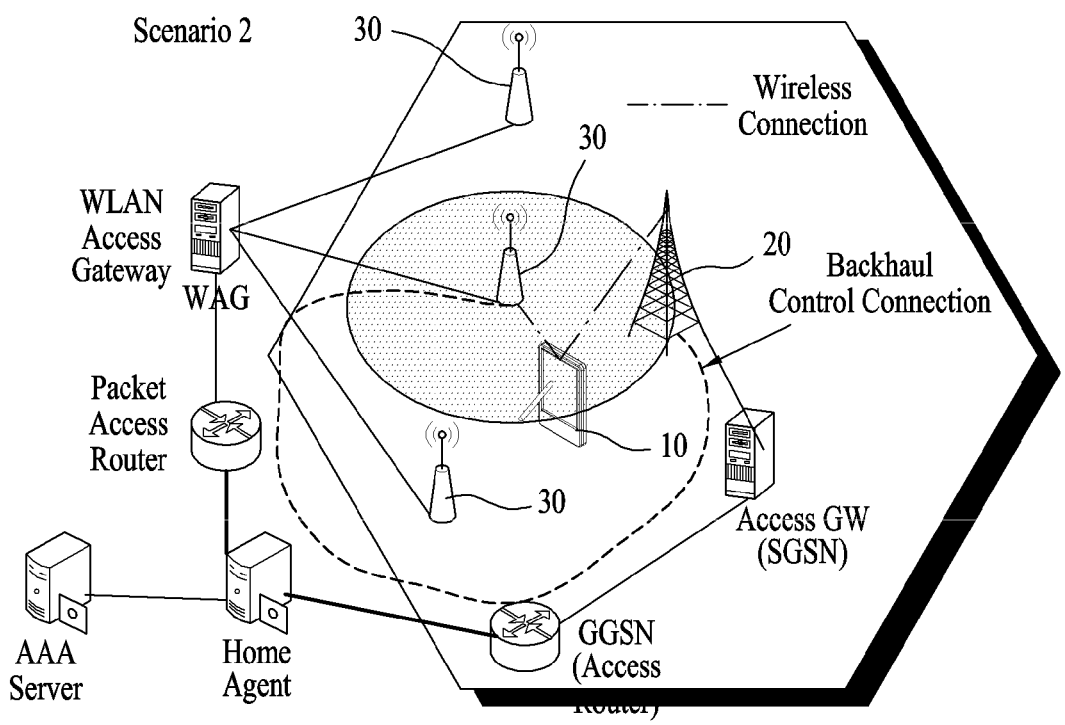
Figure 2C:
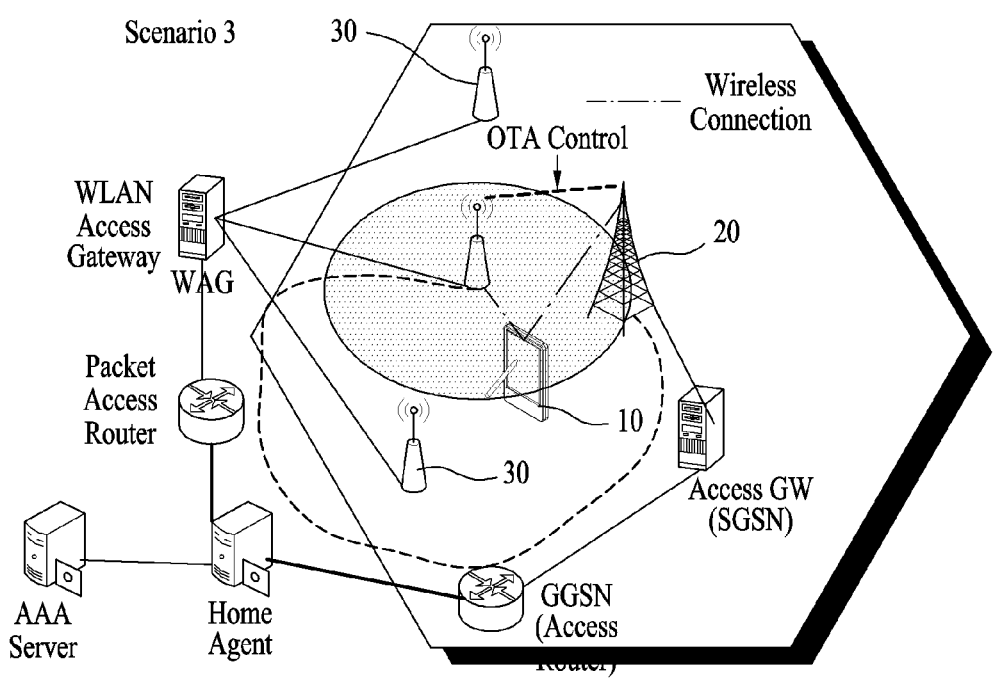

FIGS. 2A to 2C are diagrams illustrating an interaction scenario between a base station of a cellular network and a WLAN AP.

Referring to FIGS. 2A to 2C, the network includes a primary network and a secondary network. In this case, it is assumed that the primary network refers to the cellular network and the secondary network refers to the WLAN. The primary network may include a user equipment 10 and a cellular base station 20, and the secondary network may include a user equipment 10 and a WLAN AP 30.

FIG. 2A illustrates an interaction scenario 1, and the cellular base station 20 and the WLAN AP 30 may interact with each other in the same core network through their respect gateways, wherein authentication information and IP flow mobility function are supported.

FIG. 2B illustrates an interaction scenario 2, and the WLAN AP 30 may perform communication with the cellular base station 20 through a backbone network in addition to the interaction scenario 1 of FIG. 2A. In this case, a cooperation operation of a level allowable by backbone delay may be performed.

FIG. 2C illustrates an interaction scenario 3, wherein the WLAN AP 30 may perform communication with the cellular base station 20 through over-the-air (OTA) in addition to the interaction scenario 1, whereby organized interaction may be performed. In particular, in the interaction scenario 3, the WLAN AP 30 includes a function of the cellular user equipment.

At the network access step, the user equipment 10 notifies the cellular base station 20 of WLAN access capability and also notifies the cellular base station 20 to support a cooperation operation. The base station may transmit necessary information to the user equipment on the basis of the notified information.

The cellular base station 20 may transmit information of the WLAN AP 30 or AP group, which may be accessed on the basis of signal strength level of the received signal or the location of the user equipment 10, to the user equipment 10. In this case, the information of the WLAN AP 30 or the AP group may include MAC address of subsystem identification (SSID) AP, WEP key, Channel Number (frequency information), frequency hopping information, protocol version (11a/b/n . . . ) of the AP, and offset between frames of a beacon and a base station. At this time, the offset between the frames of the beacon and the base station may be represented by the difference between a relative location of the beacon and a specific frame time to easily discover the beacon.

Then, the user equipment may measure the beacon of the AP and notify the cellular base station of the possibility of access of the corresponding AP. In other words, the user equipment may notify the cellular base station of the possibility of access of the corresponding AP by measuring the received signal level of the beacon of the AP. The cellular base station may transmit detailed access information to the user equipment if the received signal level of the specific AP is more than a constant value, whereby the user equipment may access the network. The cellular base station may command a specific user equipment to access the network to distribute load. For the cooperative operation between the cellular base station and the WLAN AP, the procedure of performing the cooperative operation of the user equipment with the cellular base station will be described per scenario with reference to the accompanying drawings.

FIG. 3 is a diagram illustrating a procedure of performing a cooperative operation of a user equipment with a cellular base station in case that the user equipment searches for AP.

When the user equipment desires to access the AP for some reasons, the user equipment may transmit an access request message to the cellular base station (S310). Then, the cellular base station transmits a response message, which includes information of accessible AP candidates, to the user equipment in accordance with the status of the user equipment (S320). The user equipment that has received the response message may search for the AP on the basis of the received response message and perform measurement (S330). If the user equipment reports the result of search and measurement to the base station (S340), the cellular base station may allocate a target AP and provide detailed information required for access to the user equipment (S350). Afterwards, the user equipment performs a procedure of accessing the target AP in accordance with a guide of the cellular base station (S360).

Figure 4:
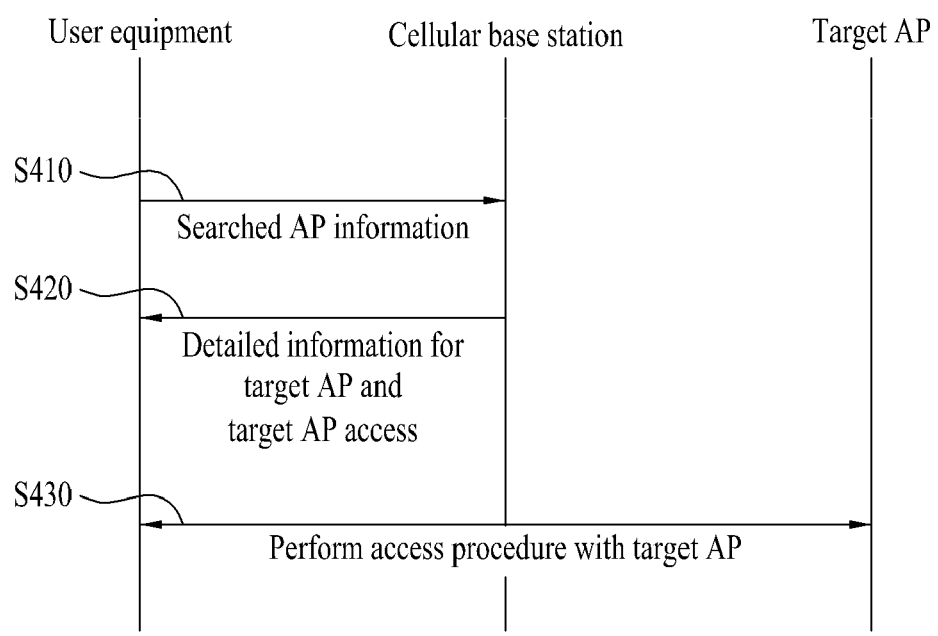
FIG. 4 is a diagram illustrating a procedure of performing a cooperative operation of a user equipment with a cellular base station in case that the user equipment has already searched for AP.

FIG. 4 is a diagram illustrating a procedure of performing a cooperative operation of a user equipment with a cellular base station in case that the user equipment has already searched for AP.

Referring to FIG. 4, the user equipment transmits the searched AP information to the cellular base station (S410). At this time, the searched AP information may include SSID and measurement information. If the searched APs are the APs, which may be aggregated with the cellular base station, the cellular base station may allow access and transmit detailed information required for access to the user equipment (S420). Afterwards, the user equipment performs the procedure of accessing the target AP in accordance with the guide of the cellular base station (S430).

Figure 5:
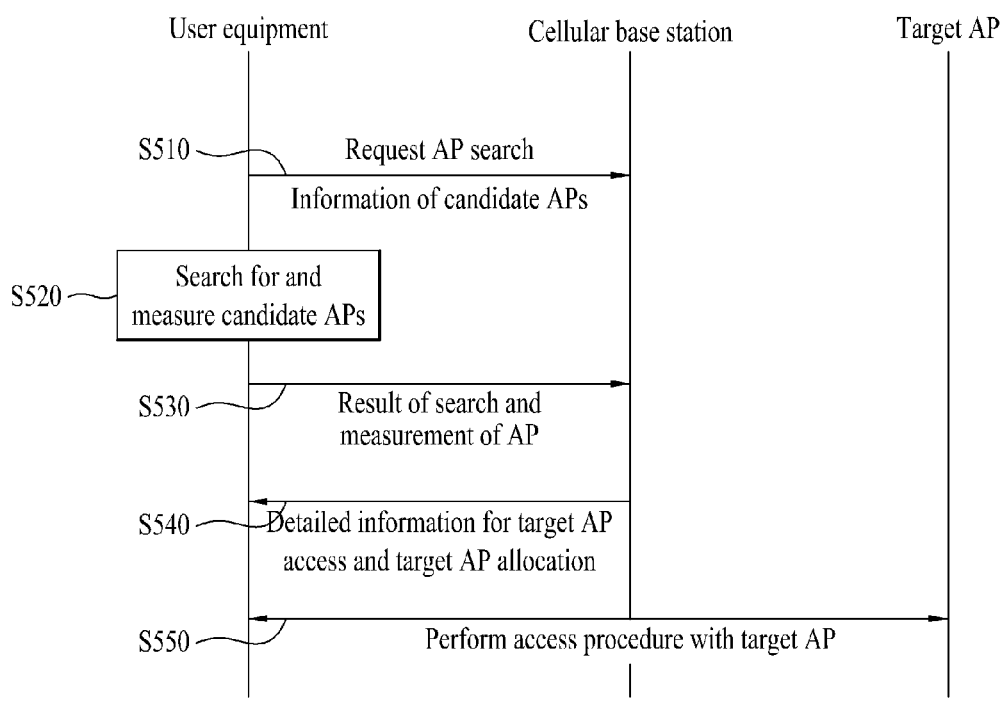
FIG. 5 is a diagram illustrating a procedure of performing a cooperative operation of a user equipment with a cellular base station in case that the cellular base station commands the user equipment to search for AP.

FIG. 5 is a diagram illustrating a procedure of performing a cooperative operation of a user equipment with a cellular base station in case that the cellular base station commands the user equipment to search for AP.

Referring to FIG. 5, the cellular base station may request the user equipment to search for the AP to distribute load of the cellular base station by considering the status, throughput, etc. of the user equipment (S510). At this time, the cellular base station may transmit information of candidate APs to the user equipment (S510). The user equipment may search for and measure the accessible APs on the basis of the information of the candidate APs (S520). If the user equipment reports the result of search and measurement to the cellular base station (S530), the cellular base station may allocate the target AP and provide detailed information required for access to the user equipment (S540). Afterwards, the user equipment performs the procedure of accessing the target AP in accordance with the guide of the cellular base station (S550).

If access to the corresponding target AP is completed, the user equipment notifies access information to the cellular base station. At this time, the user equipment may transmit IP address allocated from the WLAN to the cellular base station. After receiving the corresponding IP address, the cellular base station may register the received IP address with a home agent and achieve IP mobility by binding IP for the WLAN with IP for the cellular network. If the home agent may control IP allocation of the WLAN AP, the home agent may previously allocate one reserved IP of IP area of the WLAN to the user equipment, and the user equipment may access the WLAN by using the IP address.

If the user equipment desires to transmit data to the uplink, the cellular base station may command the user equipment to transmit uplink grant to the WLAN AP by considering QoS of the corresponding flow and a current load condition of the cellular base station, resource efficiency, etc.

Coordinated Operation Between Cellular Base Station and WLAN AP

Figure 6A:
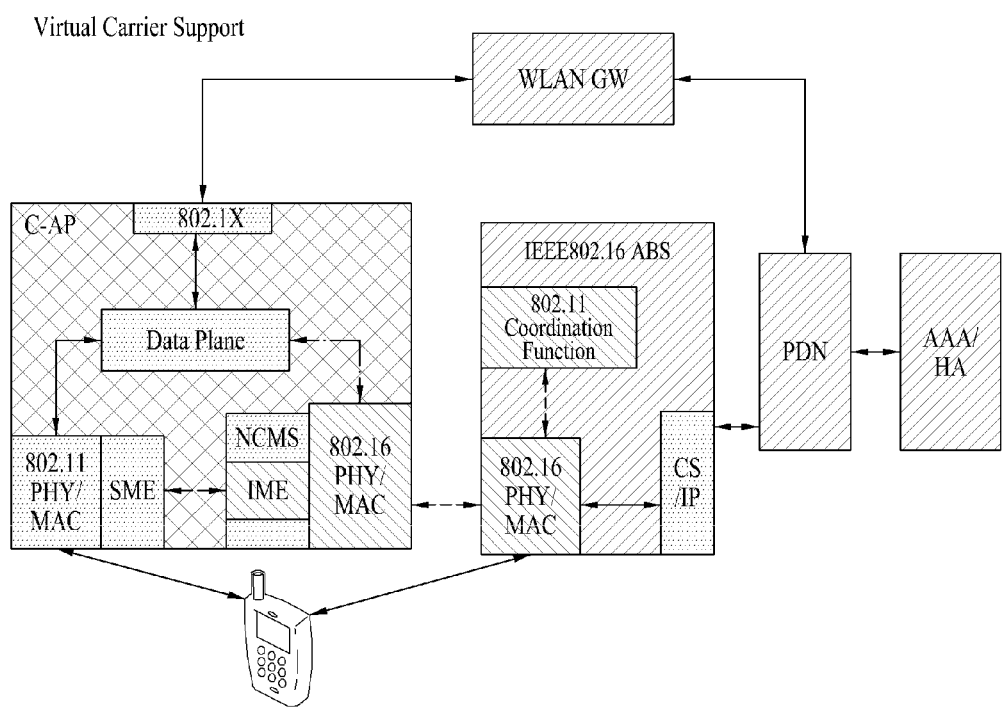

In the aforementioned scenario related to FIG. 2C, the AP, which interacts with the base station, is referred to as a coordinated AP (C-AP), and has a structure shown in FIGS. 6A and 6B. Two interaction scenarios between the cellular base station and the WLAN AP are shown in FIGS. 6A and 6B.

In the scenario shown in FIG. 6A, the AP has its own wire backhaul, and transmits control information only to the cellular base station through a cellular wireless link. Meanwhile, in the scenario shown in FIG. 6B, the AP may transmit both the control information and relayed data through the wireless link with the cellular base station by operating like Multi-RAT relay.

The AP is registered with the cellular base station, that is, accesses the cellular system before activating the wireless LAN and then is registered with the cellular system. Alternatively, even in case that the AP is already activated, the AP may be registered with the cellular base station having higher coverage. This registration procedure may be performed through MAC message or higher message. This information may be transmitted to a management entity of the cellular base station, or may be transmitted to a network entity, which manages interworking, whereby the information may be managed by being collected.

In this case, the AP may transmit its various kinds of information to the cellular base station. The AP may transmit configuration information, whereby the cellular base station may notify the user equipments of the information of the AP on the basis of the configuration information. Alternatively, the cellular base station may directly notify the information. The network provider may automatically allocate all of configurations of the AP by adding the corresponding function to the AP similarly to a femto base station. In particular, if the C-AP knows its location information by itself, the C-AP may transmit its location information to the cellular base station during registration. Alternatively, the cellular base station may receive measurement information related to the location of the C-AP through techniques such as location based service (LBS). The cellular base station may allow the AP to scan neighboring APs and receive information of the neighboring APs, whereby a relative location may be estimated.

Also, since the network providers may identify the location of the AP through base station information received from the AP, the network providers may estimate location information of the user equipment that has accessed the corresponding AP on Internet (location information may be used to identify location information of IP phone in E 911).

In view of timing synchronization, timing synchronization may preferably be performed for cooperation between the cellular base station and the user equipment. In particular, it is efficient that a period of a beacon of the AP or a method for configuring a slotted frame is synchronized with frame timing of the cellular base station. For example, a transmission period of the beacon may be synchronized with a superframe period of the IEEE 802.16m. If a plurality of APs are set to have the same period and different offsets, interference problem may be solved. In particular, if transmission and reception timing is well adjusted by the cellular base station and the AP, a problem of co-located co-existence, which occurs in the user equipment, may be solved. In other words, interference control may be performed in such a manner that uplink transmission is not performed for the cellular base station while the user equipment is receiving important information (for example, beacon, etc.) through the wireless LAN. For example, if transmission timing of the beacon is synchronized with transmission timing of a superframe header, the beacon and the superframe header may be received without any interference.

In case of the IEEE 802.16 system or the LTE system, these two systems have frame periods of 5 ms and 10 ms, respectively. In case of the WLAN, although various configurations may be provided, a beacon transmission period of 102.4 ms is provided in most cases. In this case, frame synchronization is performed in the two systems per 2560 ms, whereby relative frame synchronization may be used well to perform operation without interference. In this case, the cellular base station may notify the user equipment of the beacon transmission timing of each AP in the form of frame offset as compared with the current frame to assist that the user equipment may minimize AP scanning time.

The user equipment may identify beacon frame information of a neighboring AP of the AP, which is currently accessed by the user equipment, from the cellular base station, and perform scanning for a beacon signal of the neighboring AP even in case that the user equipment currently accesses the AP. In order to avoid interference, the cellular base station may notify each AP of beacon transmission timing of the neighboring AP, and the APs may avoid interference in such a manner that they do not transmit data at the corresponding timing.

In connection with AP scanning of the user equipment, the user equipment of a dual mode requires much time and much power to search for the AP without prior information. The C-AP may transmit a specific signal to the user equipment through a cellular network at a specific time so that the user equipment may search for the C-AP while performing cellular communication. The user equipment may identify whether there is any WLAN AP near the user equipment by measuring the specific signal every fixed time. For example, in the IEEE 802.16m system, the base station may not transmit a preamble at the specific time to reinforce a location measurement function. At this time, the APs transmit a set signal. In this case, the set signal is the signal previously discussed with the cellular base station, and allows the user equipment to know the presence of the C-AP in accordance with a type of the signal and transmission timing of the signal.

Since this set signal may have a specific pattern in accordance with the location of the AP and a frequency band which is used, if the user equipment receives the signal and then reports the received information to the base station, the base station may transmit a proper AP list to the user equipment. In particular, if the transmitted signal is configured to identify nine channels of WLAN 2.4 GHz bandwidth from one another, the user equipment searches for one WLAN channel only after receiving the corresponding signal, whereby load due to search may be reduced.

In addition to the preamble, after the cellular base station agrees not to transmit a signal to a specific point at a fixed time, the C-AP may transmit a set signal to the specific point. In this case, the cellular base station may notify the user equipment of the point for data transmission for the C-AP through the control channel (for example, A-MAP or physical downlink control channel (PDCCH)), wherein station identifier (STID) for C-AP allocation or cell radio network temporary identifier (C-RNTI) may be allocated previously, and A-MAP or PDCCH masked with cyclic redundancy check (CRC) by using the allocated value may be transmitted to the user equipment to notify the user equipment of the point for data transmission.

More actively, the cellular base station allows the C-AP to transmit specific resources, wherein information (for example, beacon information) of each C-AP may be encoded in the resources. In this case, the cellular base station may notify the user equipment of the point for data transmission for the C-AP through the A-MAP or the PDCCH, wherein station identifier (STID) for C-AP allocation or cell radio network temporary identifier (C-RNTI) may be allocated previously, and A-MAP or PDCCH masked with cyclic redundancy check (CRC) by using the allocated value may be transmitted to the user equipment to notify the user equipment of the point for data transmission. The user equipment may identify information of a neighboring AP by decoding a specific burst at a specific time.

Although the standardized technology should be applied to implement the aforementioned existing system, a method for minimizing change of the standard may be applied as a medium step. In the corresponding method, the C-AP receives partial information of the cellular base station without performing direct communication with the cellular base station and controls communication with a control server within the network on the basis of the received information.

Figure 7:
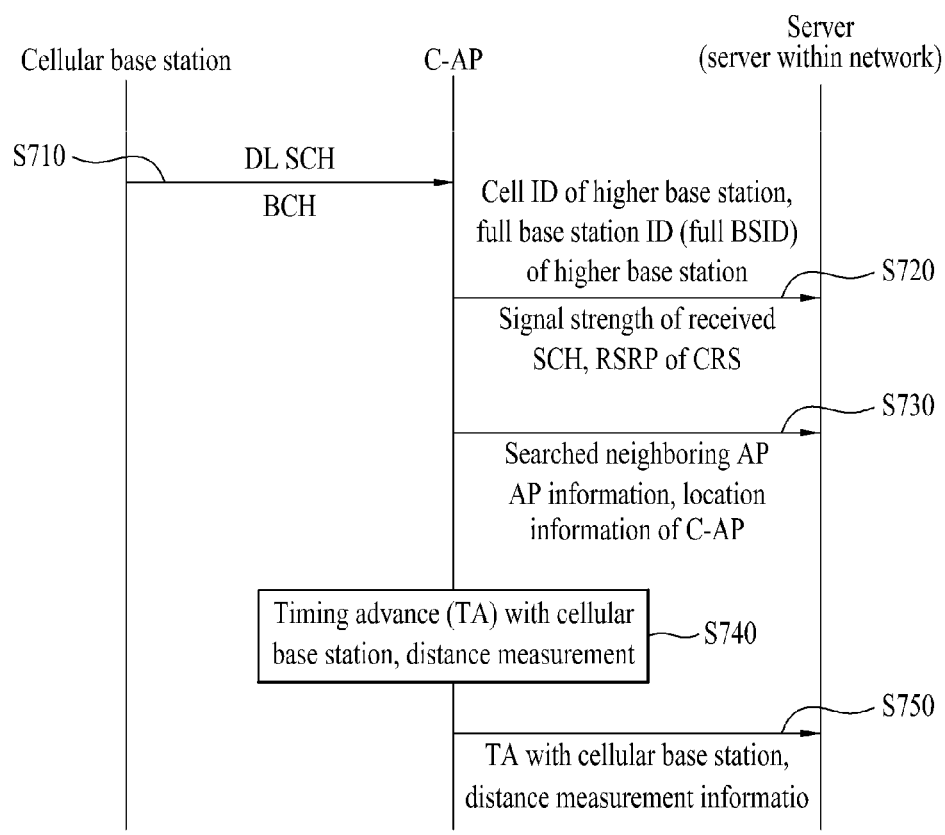
FIG. 7 is a diagram illustrating an operation scenario between a C-AP and a cellular base station in accordance with one embodiment of the present invention.

Hereinafter, an operation scenario between the C-AP and the cellular base station will be described with reference to the accompanying drawing. FIG. 7 is a diagram illustrating an operation scenario between a C-AP and a cellular base station in accordance with one embodiment of the present invention.

Referring to FIG. 7, the C-AP may identify cell ID of a higher base station (for example, cellular base station that has transmitted DL SCH) by receiving a downlink synchronization channel (DL SCH) of the cellular base station (S710). At this time, the C-AP may receive the DL SCH from the cellular base station (S710), and then may transmit current EARFCN and bandwidth of the center frequency of the base station and cell ID of the higher base station to the server within the network after identifying cell ID of the higher base station (S720). If the C-AP has a function of receiving a downlink (DL), the C-AP may identify full base station ID (full BS ID) of the higher base station by receiving a broadcast channel (BCH) (for example, super frame header) of the cellular base station and additionally transmit the full BSID to the server within the network (S720). Also, the C-AP may measure signal strength of a synchronization channel (SCH) of the cellular base station and transmit the measured signal strength to the server within the network (S720).

If the C-AP may measure a common reference signal (CRS) of a cellular modem, the C-AP may additionally transmit strength (for example, reference signal received power (RSRP)) of the reference signal to the server within the network (S720), and may measure and report RSRP of a neighboring base station if possible (S720). In this case, the C-AP may transmit RSRP of a predetermined number (for example, n) of base stations to which high RSP RP is received, to the server within the network if the power is turned on (S720), whereby brief location information of the C-AP may be transmitted.

Also, the C-AP may additionally transmit information of the searched neighboring APs and its location information to the server within the network (S730). If the C-AP has an uplink transmission function, the C-AP may perform uplink timing synchronization by using random access/ranging (RACH/Ranging) and measure timing advance (TA), whereby the C-AP may partially measure the distance with the cellular base station (S740). If the C-AP may perform uplink data transmission and reception, the C-AP may transmit TA information and distance information with the cellular base station to the server within the network through the uplink, wherein base station related information may be omitted (S750).

Then, the server within the network may combine the above information and construct a database related to information on the location of the C-AP, the higher cellular base station and the neighboring AP. When the power is turned on, when a router is changed, or when information on higher base stations is periodically changed and then there is any change, the C-AP transmits the changed information to the server within the network. The server within the network may control configuration of the C-AP on the basis of the information received through the C-AP and share the control of the C-AP with the cellular base station. For example, the server within the network may control a frequency channel, C-AP beacon timing, SSID, BSID, transmission power, etc. The C-AP controls its beacon timing on the basis of timing of the cellular base station at a relative time.

In order to perform scenario operation related to FIG. 7, the C-AP needs to have a simple cellular downlink receiver (or receiver). A processor of the C-AP is configured to detect a synchronization channel (SCH) of the cellular base station and perform synchronization confirmation, and the receiver of the C-AP is additionally provided with a function capable of receiving the BCH. Also, the C-AP needs to partially correct a WiFi/C-AP synchronization controller for synchronizing with cellular base station timing, and higher application for controlling the C-AP should be developed.

The server within the network may be developed in cooperation with the network provider, and has functions as follows. For reference, an access network discovery & selection function (ANDSF) server of the 3GPP may be used as the server within the network, and may be configured to perform the following functions. For example, the server within the network may perform C-AP control function (database control of location, configuration control, etc.), WLAN scanning control function (timing, etc.), Off-loading control function, etc.

The user equipment additionally provides a scanning function of the C-AP/Off-loading function through the control of the server within the network, whereby the processor of the user equipment may perform canning of the C-AP and perform off-loading. In particular, if the user equipment is configured to scan the AP at a relative time as compared with cellular base station timing at a specific frequency during scanning of the C-AP, power consumption of the user equipment may be reduced considerably.

C-AP Discovery Technology

Figure 8:
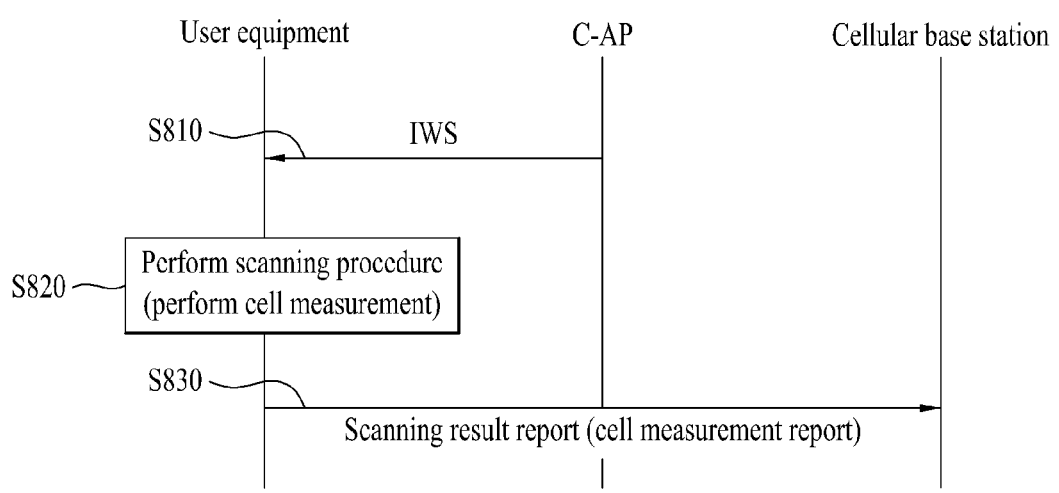
FIG. 8 is a diagram illustrating a procedure of searching for C-AP according to one embodiment of the present invention.

FIG. 8 is a diagram illustrating a procedure of searching for C-AP according to one embodiment of the present invention.

The C-AP discovery (or detection) technology of the user equipment is associated with the interworking signal (IWS) transmission technology. Referring to FIG. 8, the C-AP may transmit the IWS to the user equipment through a transmission band of the cellular base station (S810). In this case, examples of the IWS include a SCH and a CRS. The IWS is arranged in accordance with a time division manner, whereby the C-APs may transmit the IWS on a time axis at different timing.

Cell ID may be reserved for the C-AP, and the C-AP may transmit its cell ID at a specific timing. In this case, the cell ID reserved for the C-AP may be controlled by or allocated from the cellular base station, or may be allocated from the server within the network. At this time, the cell ID may be allocated by a method which is previously set.

The user equipment may acquire cell ID information of the C-AP from the received IWS and perform scanning for detecting the C-AP on the basis of the acquired cell ID (S820). Alternatively, as described above, if the cell ID is allocated or previously reserved for the C-AP and then a list of the allocated or reserved cell ID is forwarded to the user equipment, the user equipment may perform scanning for detecting the C-AP on the basis of the list (S820).

The user equipment may perform a general scanning procedure and report the result of scanning (or the result of cell measurement) to the cellular base station (S830).

In the meantime, if the cellular base station may control such scanning and the network provider may manage the controlled scanning, it is advantageous in that the scanning procedure may be performed without any great change of the existing standard document. If the base station corrects some DM IF, the scanning procedure may be performed without great impact on the base station.

The cell ID information transmitted to the user equipment may include use frequency information of the cell. In this case, the user equipment may acquire the use frequency information of the cell through the acquired cell ID. The cell ID may be reserved for each frequency allocation (FA). In this case, if the user equipment acquires the cell ID, the user equipment may identify FA corresponding to the acquired cell ID. Alternatively, transmission timing may represent FA in accordance with time division multiplexing (TDM), wherein only one cell ID may be used. If the transmission timing represents FA in accordance with the TDM mode, the user equipment may identify FA information on the basis of the time when the IWS is transmitted.

In the meantime, instead of the C-AP, which transmits the IWS directly, an IWS transmitter, which transmits IWS to the periphery of the C-AP, may be provided separately. The IWS transmitter may be connected to the C-AP in the form of USB port or may be used by plug-in to a power terminal. The IWS transmitter transmits specific cell ID to a specific frequency area, whereby the user equipment may easily identify that C-AP exists in the periphery of the specific frequency area. In other words, if the user equipment receives the IWS, the user equipment may identify that the C-AP exists in the periphery. For example, the IWS transmitter may be implemented as a function similar to "alarm service" used by LG Telecom which is a mobile communication service provider.

As described above, if the C-AP transmits the IWS, the C-AP should be provided with a function capable of transmitting the IWS through the transmitter. However, if the IWS transmitter is provided separately, the C-AP does not need to have a function of transmitting the IWS.

In the aforementioned various embodiments of the present invention, the cellular base station may include a macro base station and a femto base station, and may be applied to a relay node.

The aforementioned embodiments are achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment. Moreover, it will be apparent that some claims referring to specific claims may be combined with another claims referring to the other claims other than the specific claims to constitute the embodiment or add new claims by means of amendment after the application is filed.

It will be apparent to those skilled in the art that the present invention can be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

INDUSTRIAL APPLICABILITY

The method for performing a cooperation operation between heterogeneous network and the method for enabling a user equipment to detect a base station in a wireless communication system that performs a cooperative operation between heterogeneous networks may be used industrially in various communication systems such as 3GPP LTE, LTE-A and IEEE 802.

What is claimed is:

1. A method for offloading uplink data by a user equipment in a wireless communication system that performs cooperative operations between heterogeneous networks, the method comprising:
   receiving, from a base station, first information related to a set of candidate access points (APs) configured by the base station;
   measuring the set of candidate APs;
   transmitting a measurement report to the base station;
   receiving, from the base station, a command, the command instructing the user equipment to offload uplink data to a wireless LAN (WLAN), wherein the command is transmitted from the base station when a signal strength of the WLAN is greater than a predefined threshold value;

receiving, from the base station, second information related to at least one access point (AP), the at least one AP is configured for offloading by the base station;

performing a connection procedure with an AP of the at least one AP based on the received second information;

determining traffic having a specific quality of service (QoS) which is offloadable to the WLAN; and offloading the uplink data corresponding to the determined traffic to the AP according to the command while maintaining a connection state with the base station.

2. The method according to claim 1, further comprising: when the connection procedure with the AP is completed, transmitting an assigned IP address to the base station.

3. The method according to claim 1, wherein the first information related to the set of candidate APs comprise at least one identifier (ID) of the set of candidate APs.

4. A user equipment for offloading uplink data in a wireless communication system that performs cooperative operations between heterogeneous networks, the user equipment comprising:

a receiver;

a transmitter; and a processor operatively connected to the receiver and the transmitter, the processor configured to:

receive, from a base station, first information related to a set of candidate access points (APs) configured by the base station;

measure the set of candidate APs;

transmit a measurement report to the base station;

receive, from the base station, a command, the command instructing the user equipment to offload uplink data to a wireless LAN (WLAN), wherein the command is transmitted from the base station when a signal strength of the WLAN is greater than a predefined threshold value;

receive, from the base station, second information related to at least one access point (AP), the at least one AP is configured for offloading by the base station;

perform a connection procedure with an AP of the at least one AP based on the received second information;

determine traffic having a specific quality of service (QoS) which is offloadable to the WLAN; and offload the uplink data corresponding to the determined traffic to the AP according to the command while maintaining a connection state with the base station.

5. The user equipment according to claim 4, wherein the processor is further configured to transmit an assigned IP address to the base station when the connection procedure with the AP is completed.

6. The user equipment according to claim 4, wherein the first information related to the set of candidate APs comprise at least one identifier (ID) of the set of candidate APs.

* * * * *